United States Patent [19]

Brendel

[11] 3,816,193

[45] June 11, 1974

[54] METHOD OF PREPARING A BERYLLIUM HYDRIDE- CONTAINING COMPOSITE

[75] Inventor: Gottfried J. Brendel, Baton Rouge, La.

[73] Assignee: Ethyl Corporation, Richmond, Va.

[22] Filed: Jan. 31, 1969

[21] Appl. No.: 797,726

[52] U.S. Cl..................... 149/109, 149/87, 423/645
[51] Int. Cl............................................. C06b 19/00
[58] Field of Search........ 149/109, 87; 23/360, 300; 423/265

[56] References Cited
UNITED STATES PATENTS

| | | | |
|---|---|---|---|
| 3,035,948 | 5/1962 | Fox................................... | 149/87 X |
| 3,441,455 | 4/1969 | Woods et al...................... | 149/87 X |

*Primary Examiner*—Stephen J. Lechert, Jr.
*Attorney, Agent, or Firm*—Donald L. Johnson; John F. Sieberth; Lewis Hess

[57] ABSTRACT

Crystalline beryllium hydride composites of increased density are prepared by heating, to an elevated temperature and under elevated pressure, the corresponding amorphous composites containing a relatively small amount of lithium as a hydride or alkyl derivative. The elevated temperature is maintained for a period of time and the pressure is alternately reduced and reestablished either during the heating process or during the period of maintenance at the elevated temperature to bring about the desired crystallization and densification.

12 Claims, No Drawings

METHOD OF PREPARING A BERYLLIUM HYDRIDE- CONTAINING COMPOSITE

The invention herein described was made in the course of or under a contract or subcontract thereunder with the United States Air Force.

This invention relates to a novel process for the preparation of crystalline beryllium hydride of increased density.

Beryllium hydride has been synthesized by Coates and Glockling [J. Chem. Soc. 2,526 (1954)] by the pyrolysis of di-tertiary-butylberyllium etherate and by Head, Holley and Rabideau [J. Am. Chem. Soc. 79, 3,687 (1957)] using ether-free di-tertiary-butylberyllium. More recently a superior product was obtained by the pyrolysis of tertiary-butylberyllium etherate dissolved in a high-boiling inert solvent (co-pending application Ser. No. 176,865, filed Feb. 26, 1962).

Because of its high reducing power and low molecular weight, beryllium hydride is of great interest as a potential fuel component of solid rocket propellants. For this utility a relatively high density is of great importance. The beryllium hydride products of the above synthetic processes are without exception amorphous in structure and as a result are characterized by a relatively low density, 0.57 to 0.67 g/cc, which limits their suitability for this application.

Still more recently it was found that when amorphous beryllium hydride containing a relatively minor amount of certain lithium compounds is subjected to compaction at elevated temperature and pressure, the hydride is converted to a crystalline material of significantly higher density than the amorphous beryllium hydride similarly compacted in the absence of additives. A number of lithium compounds were found effective for inducing crystallization via compaction (co-pending application Ser. No. 392,677, filed Aug. 24, 1964).

The foregoing crystallization process employed high pressures (in the range of from 100,000 to 500,000 psi) and therefore required specially designed high-pressure equipment and extensive safety precautions, both of which entailed considerable expense. It is an object of the present invention to provide a process for the preparation of crystalline beryllium hydride of high density which will avoid the need for heavy equipment and the expense thereof associated with the above procedures.

A further object is to provide a process for the preparation of high-density crystalline beryllium hydride wherein the crystallization-densification process requires neither very high pressures nor long reaction times. Additional objects will appear hereinafter.

In its broadest aspect, this invention relates to the use of cyclic pressure changes in the crystallization of amorphous beryllium hydride.

A preferred embodiment of this invention is the process for the preparation of a crystalline beryllium hydride-containing composite of increased density which comprises heating, to a temperature of from about 120° to about 250°C. and under a pressure in the range of from about 40,000 to about 200,000 psi, an amorphous beryllium hydride-containing composite which contains from about 99.9 to about 85.0 mole percent of beryllium hydride and from about 0.1 to about 15.0 mole percent of lithium hydride, lithium aluminum tetrahydride or an alkyl lithium wherein the alkyl radical contains from 2 to about 8 carbon atoms, maintaining the above temperature for a period of from about 0.5 to about 4 hours, repeatedly and cyclically reducing the above high pressure to a pressure in the range of from ambient pressure to about 40,000 psi, and re-establishing the above high pressure. The reduction and re-establishment of the pressure are carried out either during the heat-up period or during the period of maintenance of the above temperature.

A particularly preferred embodiment of this invention is the use in the above process of an upper-range crystallization-densification pressure of from about 90,000 to about 100,000 psi, a lower-range pressure of from ambient pressure to about 40,000 psi, a temperature in the range of from about 200° to about 220°C., a heating period of from about 0.5 to about 2.0 hours and an amorphous beryllium hydride-containing composite which contains from about 0.5 to about 3.0 mole percent of the lithium compound.

Other particularly preferred embodiments of this invention are, respectively, the use of an upper-range crystallization-densification pressure in the range of from about 90,000 to about 100,000 psi, the use of a temperature in the range of from about 200° to about 220°C., the use of a heating period of from about 0.5 to about 2.0 hours, and the use of an amorphous beryllium hydride-containing composite which contains from about 0.5 to about 3.0 mole percent of the lithium compound, all in the above process.

Another particularly preferred embodiment is the use in the above process of a pressure cycle wherein the upper-range pressure is repeatedly reduced to ambient pressure and reestablished.

Still another particularly preferred embodiment is the use in the above process of a pressure cycling procedure wherein the duration of a single reduction-reestablishment cycle is from about 1 to about 4 minutes.

Other embodiments will appear hereinafter.

The process of this invention exhibits a number of advantages over the processes of the prior art.

One of these advantages is that crystalline beryllium hydride of a density comparable to that of the product of the above-mentioned high-pressure process can be prepared by the present process using very much lower pressures than those previously employed. This of course avoids much of the inconvenience and expense of the prior art process. Furthermore, the pressure cycling technique of the present invention results in accelerated crystallization and densification and in a consequent saving of operating time.

The crystalline beryllium hydride product obtained by the process of this invention is a white to greyish crystalline composite. Two different crystal modifications have been indentified by their typical X-ray diffraction patterns.

One form, which is characterized by its strongest diffraction lines (in the order of decreasing relative intensity) corresponding to lattice spacings of 3.38 Angstrom units ($I/I_o$ = 100), 2.079(60), 1.347(10), 1.780(5), 3.22(3), 2.94(3), 2.84(3), 2.69(3), and 1.960(3), has been indexed as being hexagonal with the following lattice parameters: $a = b = 4.14$–$4.20$A and $c = 6.76$A, with a calculated theoretical density of about 0.82 g/cc. Its measured density by the sink-float method is 0.73–0.74 g/cc. This species is designated below as Phase 338.

The second crystalline form is characterized by its strongest diffraction lines (in the order of decreasing relative intensity) at $d$ = 3.78 Angstrom units (100), 2.95(80), 2.07(40), 2.86(20), 1.966(10), 1.938(4), 1.720(4), 1.669(3), 1.349(3), 1.263(3), 1.192(3), 1.1396(3), 1.0917(3), and 1.835(2). Its density by the sink-float method is 0.77–0.78 g/cc. This species is designated below as Phase 378.

The sink-float method consists simply of adding a lump of material to a hydrocarbon solvent and varying the temperature until the particle begins to sink or to float. The temperature at which this occurs is recorded and the density of the solvent (equal to the density of the solids) is determined from a preconstructed curve for which the density-temperature relationship has been determined. Benzene, n-nonane, 1,3,5-trimethylbenzene, and methylcyclohexane were the solvents used.

The samples for compaction were contained in sealed, thin-wall, extruded aluminum capsules which prevented contact of the sample with the hydrostatic fluid but did not significantly reduce pressure transmission to the sample.

The invention will be more fully understood by reference to the following set of illustrative examples.

In Experiments 1 and 5, the samples were pressure cycled at the indicated temperature; the other odd-numbered samples were pressure cycled during the heat-up stage. It appears that both methods of treatment are effective.

The amorphous beryllium hydride used in the process of this invention can be prepared by any method that yeilds a product of relatively high purity. The solution pyrolysis procedure hitherto described yields a highly satisfactory starting material.

The lithium compound used to initiate the crystallization can be mixed mechanically with the amorphous beryllium hydride but is preferably dissolved in or mixed with the beryllium alkyl prior to pyrolysis. The lithium initiator is suitably lithium hydride, lithium aluminum tetrahydride or an alkyl lithium compound containing from 2 to about 8 carbon atoms, for example, ethyllithium, n-propyllithium, tertiary-butyllithium, isoamyllithium, n-hexyllithium, n-heptyllithium, 2-ethylhexyllithium or n-octyllithium.

A wide range of concentrations of the lithium initiator compounds can be employed. Thus, its concentrations in the amorphous beryllium hydride can range from about 0.1 to about 15 mole percent. The preferred range of concentrations is from about 0.5 to

TABLE

Hydrostatic Compaction (Pressure Cycling) of Encapsulated Lithium — Doped Beryllium[a]

| Expt. No. | Test Conditions | | | | X-Ray Diffraction Data Estimated Concentrations (%) | | |
|---|---|---|---|---|---|---|---|
| | Pressure (Kpsi) | Temperature (°C.) | Time (Hrs) | Product Density[b] (g/cc) | Amorphous | Phase 338 | Phase 378 |
| 1[c] | 95[f] | 160 | 2.0 | 0.73–0.74 | — | — | — |
| 2 | 95 | 160 | 2.0 | 0.70–0.71 | 0 | 95–99 | 1–5 |
| 3 | 90[e] | 215 | 1.0 | 0.75–0.76 | 0 | 95–99 | 1–5 |
| 4 | 92 | 215 | 0.7 | 0.73–0.74 | 0 | 90–95 | 5–10 |
| 5 | 96[f] | 220 | 1.5 | 0.76 | 0 | 5 | 95 |
| 6 | 95 | 220 | 1.4 | 0.74 | 0 | 90 | 10 |
| 7[d] | 200[e] | 200 | 0.5 | 0.76 | 0 | ~30 | ~70 |
| 8[d] | 200 | 200[g] | 0.5 | 0.73 | 0 | 85 | 15 |

[a]Composite feed contained 95–95.7 weight percent BeH$_2$, 1.3 weight percent Li. precompacted within Al capsule.
[b]As determined by sink-float method.
[c]Precompacted, thermally fused pellet encapsulated in Teflon.
[d]Compaction took place in piston mold equipment.
[e]Pressure was released and reapplied during heat-up (twice in Expt. No. 3 and four times in Expt. No. 7). Release time: 3–5 minutes.
[f]Pressure was four times alternately released and reapplied at compaction temperature. Release time: 4 minutes.
[g]Slow cooling rate: 86°C./hr.

In the above table, the experiments are grouped in pairs. Inspection will show that the members of a given pair have been carried out under substantially identical conditions except for pressure cycling. The odd numbered member of each pair was carried out with the use of pressure cycling and the even numbered member in the absence of pressure cycling. In every case it will be seen that the density of the pressure cycle sample exceeds that of the non-pressure cycle sample by 0.02 to 0.03 g/cc. This difference is a highly significant one for propellant utility.

Experiments 1 and 2 show that a low operating temperature results in relatively low product density although even here the use of pressure cycling produces the expected increase in density. Experiments 3 and 4 show the effect of cycling at higher temperatures. Experiments 7 and 8, which were compacted in a piston mold, show the same density increase with pressure cycling as the other samples, which were subjected to hydrostatic compaction.

about 3.0 mole percent, because higher percentages do not notably improve crystallization, polymorph distribution and density whereas lower percentages result in incomplete crystallization. Moreover, the sensitivity of the product to air and moisture varies directly with the lithium content and at higher lithium concentrations this sensitivity poses a problem of handling the material without excessive decomposition.

The crystallization-densification process of this invention can be carried out at temperatures within the range of from about 120° to about 250°C., but temperatures within the range of from about 200° to about 220°C. are preferred since lower temperatures appear to retard crystallization and therefore densification, whereas higher temperatures do not significantly accelerate densification but increase the rate of thermal decomposition.

The upper-range cycle pressure employed in the present process can vary from about 40,000 to about 200,000 psi but pressures in the range of from about 90,000 to about 100,000 psi are preferred because, at the preferred temperatures, pressures in this narrower range are sufficient to convert the bulk of the hydride to the high pressure polymorph and consequently to yield product of increased density. The lower range pressure can vary from ambient pressure to about 40,000 psi.

The time required for the completion of the process of the invention is a complex function of the other variables; a period in the range of from about 30 minutes to about 4 hours is generally satisfactory. However, a period of from about 30 minutes to about 2 hours is preferred because this shorter period is adequate to yield essentially complete crystallization and densification when preferred values of the other variables are employed.

The duration of the low-pressure phase of the pressure cycle can range from 1 minute or less to 30 minutes or more; periods of from about 1 to about 4 minutes are preferred because longer periods result in a measurable amount of thermal degradation, which interferes with the densification process.

There is no theoretical limit to the number of pressure cycles which can be employed in the process of this invention. However, from a practical viewpoint, 1 to 4 cycles suffice, depending upon the other operating conditions, to produce a signifcant and important density increase, whereas the use of a larger number of cycles does not produce a further density increase commensurate with the effort and expense involved. The embodiment which comprises carrying out the pressure reduction-re-establishment cycle from 1 to 4 times during the densification process of the invention is therefore preferred.

The process of the invention can be carried out under any atmosphere inert to both beryllium hydride and the lithium initiator compound. The use of dry nitrogen is preferred because of its availability and economy. Other suitable protective atmospheres include gaseous saturated hydrocarbons such as methane and ethane and the noble gases helium, neon, argon, krypton and xenon.

The relatively high density of the crystalline composite of this invention permits formulation of liquid and solid propellants containing a higher weight percent loading of beryllium hydride. This results in propellants having a significantly higher delivered impulse. Furthermore, the crystalline character of the product leads to increased compatibility with other fuel components and to increased ease of handling and mixing.

Moreover, the ease of decomposition with dilute acid of the dense beryllium hydride prepared by the process of this invention makes it a useful and convenient source for the production of small amounts of pure hydrogen in the field.

I claim:

1. The process for the preparation of a crystalline beryllium hydride-containing composite of increased density which comprises subjecting an amorphous beryllium hydride-containing composite to a pressure within the range of from about 40,000 to about 200,000 psi while heating said amorphous composite to a temperature between about 120° and about 250°C. and, thereafter, while maintaining the composite at a temperature between about 120° and about 250°C., alternately a. reducing the pressure imposed on the heated composite to a lower pressure within the range of from about atmospheric pressure to about 40,000 psi, and b. increasing the pressure imposed on the heated composite to a higher pressure within the range of from about 40,000 to about 200,000 psi, said composite containing from about 99.9 to about 85.0 mole percent of beryllium hydride and from about 0.1 to about 15.0 mole percent of lithium hydride, lithium aluminum tetrahydride or an alkyllithium wherein the alkyl radical contains from 2 to about 8 carbon atoms.

2. The process of claim 1 wherein said higher pressure is in the range of from about 90,000 to about 100,000 psi.

3. The process of claim 1 wherein said temperatures are in the range of from about 200°C to about 220°C.

4. The process of claim 1 wherein said higher pressure is in the range of from about 90,000 to about 100,000 psi and said temperatures are in the range of from about 200° to about 220°C.

5. The process of claim 1 wherein said amorphous beryllium hydride-containing composite contains from about 0.5 to about 3.0 mole percent of said lithium compound.

6. The process of claim 1 wherein the duration of $a$ is from about 1 to about 30 minutes.

7. The process of claim 1 wherein the duration of $a$ is from about 1 to about 4 minutes.

8. The process of claim 1 wherein said higher pressure is in the range of from about 90,000 to about 100,000 psi, each of said temperatures is in the range of from about 200° to about 220°C., the duration of $a$ is from about 1 to about 4 minutes, the duraction of said process is from about 30 minutes to about 2 hours and said composite contains from about 0.5 to about 3.0 mole percent of said lithium compound.

9. The process of claim 1 wherein said lower pressure is essentially atmospheric pressure.

10. The process of claim 1 wherein each of $a$ and $b$ is carried out from 1 to 4 times during said process.

11. The process of claim 1 wherein the duration of said process is from about 30 minutes to about 4 hours.

12. The process of claim 1 wherein the duration of said process is from about 30 minutes to about 2 hours.

* * * * *